(12) United States Patent
Hisazumi et al.

(10) Patent No.: US 6,685,116 B1
(45) Date of Patent: Feb. 3, 2004

(54) CRUSHING APPARATUS, CRUSHING METHOD, DISASSEMBLING METHOD, AND VALUABLES RECOVERING METHOD

(75) Inventors: Takao Hisazumi, Osaka (JP); Takeshi Uemura, Kyoto (JP); Nobuo Terada, Kyoto (JP); Yoshiaki Furuya, Kyoto (JP); Shoichi Irie, Osaka (JP); Kaoru Shimizu, Osaka (JP); Norio Hirata, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 67 days.

(21) Appl. No.: 09/720,977

(22) PCT Filed: May 29, 2000

(86) PCT No.: PCT/JP00/03421

§ 371 (c)(1),
(2), (4) Date: May 8, 2001

(87) PCT Pub. No.: WO00/72972

PCT Pub. Date: Dec. 7, 2000

(65) Prior Publication Data (65)

(30) Foreign Application Priority Data

| May 31, 1999 | (JP) | 11-151672 |
| Oct. 8, 1999 | (JP) | 11-288110 |
| Jan. 31, 2000 | (JP) | 2000-021658 |
| Mar. 13, 2000 | (JP) | 2000-068343 |

(51) Int. Cl.⁷ .............................................. B27C 17/00
(52) U.S. Cl. .................. 241/24.14; 241/19; 241/46.017
(58) Field of Search ...................... 241/14, 29, 46.017, 241/DIG. 37, DIG. 38, 24.14

(56) References Cited

U.S. PATENT DOCUMENTS

| 4,267,982 A | * | 5/1981 | Hoper |
| 4,767,069 A | * | 8/1988 | Kim .......................... 241/160 |
| 5,676,318 A | | 10/1997 | Yokoyama et al. |
| 5,683,040 A | | 11/1997 | Jakob et al. |

FOREIGN PATENT DOCUMENTS

| DE | 41 28 225 | 3/1993 |
| DE | 42 40 389 | 6/1993 |
| DE | 196 00 482 | 5/1997 |
| GB | 976230 | 11/1964 |
| JP | 5-147040 | 6/1993 |
| JP | 8-71443 | 3/1996 |
| JP | 9-131542 | 5/1997 |
| JP | 9-248551 | 9/1997 |
| JP | 10-015519 | 1/1998 |
| JP | 10-064431 | 3/1998 |
| JP | 10-314771 | 12/1998 |
| JP | 11-277537 | 10/1999 |
| JP | 2000-070916 | 3/2000 |

* cited by examiner

Primary Examiner—W. Donald Bray
(74) Attorney, Agent, or Firm—Wenderoth, Lind & Ponack, L.L.P.

(57) ABSTRACT

A crushing apparatus is provided for crushing a printed circuit board on which electronic components are mounted into pieces of a size ranging from a few to ten centimeters square and separating some of the components and sheathed wires from the printed circuit board. The crushing apparatus comprises a rotor 3 having a substantially conical or truncated conical projected center 6 mounted at the center of rotation thereof, a plurality of extensions 3a thereof extending from the conical projected center 6 radially and horizontally, and studs 3 and 4 mounted on the extensions 3a thereof. A drive motor 8 is provided for rotating the rotor 3, a cylindrical case 1 accommodates the rotor 3 therein, and a plurality of studs 2 mounted are on the inner side of the cylindrical case 1.

26 Claims, 13 Drawing Sheets

CRUSHING APPARATUS, CRUSHING METHOD, DISASSEMBLING METHOD, AND VALUABLES RECOVERING METHOD

FIELD OF THE INVENTION

The present invention relates to a method and an apparatus for impact crushing printed circuit boards of electric household instruments and OA equipment, which include television receivers, personal computers, air-conditioners, washing machines, refrigerators, and electronic ovens, into pieces of a few to ten centimeters square and separating (removing) from the pieces of the printed circuit boards electric components which are deformed but substantially kept in their shapes. Also, the present invention relates to a method and an apparatus for impact crushing the separated components or defective electric components claimed during the production into pieces and recovering by groups valuables such as copper, steel, and aluminum from the crushed pieces. Furthermore, the present invention relates to a method and an apparatus for impact crushing into pieces small electronic instruments, which include a video recorder/player, a small set of audio components, a radio/cassette, a vacuum cleaner, a hair dryer, and a hand-held telephone, and recovering valuables, either components or materials, from the pieces. Moreover, the present invention relates to a method of disassembling electronic components, which include tuners, radiator-provided devices, transformers, flyback transformers, and deflection yokes, into at least two groups of pieces (materials). For example, a method is provided for impact crushing the deflection yokes removed from a cathode ray tube and separating them into at least winding coils and crushed resin substrate pieces which are then recovered.

BACKGROUND OF THE INVENTION

One of such methods of recovering valuables from electronic instruments such as television receivers is disclosed in Japanese Patent Laid-open Publication (Heisei)5-147040, in which wastes including metals, plastics, and foamed resins are crushed and subjected to wind separation, metal separation, and plastic separation for recovering the valuables in desired groups (of materials). Also, disclosed in Japanese Patent Laid-open Publication (Heisei)10-15519 is a method of burning shreds of waste at lower temperatures to remove unwanted ingredients as exhaust gas and recovering not-burnt valuables from the remaining waste left at the bottom of a furnace. A method of recycling printed circuit boards is disclosed in Japanese Patent Laid-open Publication (Heisei)10-314711. This dry distillation method is designed for, after removing electronic components (including resistors, capacitors, coils, ICs, radiators, and flyback transformers), sheathed wires (cables) connecting between the electronic components, and solder adhering the components and wires to each printed circuit board, heating the printed circuit board to a range from 300° C. to 450° C. to carbonize resins of the printed circuit board and then recovering the resins, copper foils, and glass fibers in desired groups. Alternatively, a method is provided for grinding off solder from printed circuit boards on which a variety of electronic components are mounted, dismounting the electronic components, and recovering them in particular groups. Disclosed in Japanese Patent Laid-open Publication (Heisei)10-64431 is a method of recycling deflection yokes installed in a cathode ray tube of a television receiver. According to the method, a means is employed for disassembling the deflection yoke to separately recover its components.

However, the method disclosed in Japanese Patent Laid-open Publication (Heisei)5-147040 requires cooling the waste with liquid nitrogen or the like during the impact crushing. As the pieces of a particular size produced by crushing the waste are separated into respective materials, the overall system will be bulky thus increasing the cost of its facilities and recycling operation. The method disclosed in Publication (Heisei)10-15519 is implemented with a combustion furnace and a system for making the exhaust gas harmless and will hence increase the cost of the facility and recycling operation. The dry distillation method for printed circuit boards also has such a problem. The method of grinding off the solder from printed circuit boards before dismounting the components takes a considerable length of time while requiring a series of maintenance actions for replacing worn-out or clogged grinding stones. The method of disassembling the deflection yoke to recover its components in different material groups requires a hardly amount of time for its accomplishment.

SUMMARY OF THE INVENTION

The present invention is directed towards crushing at a first step a printed circuit board on which various components are mounted within a short period of time to separate and recover the components and relevant wires which are deformed more or less but maintained in substantially their original shapes. It is also directed towards crushing at a second step some of the components, including tuners, radiator sheets for ICs, and transformers, separated at the first step to separate in desired groups (of materials) and recover valuables. The present invention is further directed towards crushing an electronic instrument such as a video recorder/player, a radio cassette recorder/player, a set of small audio devices, a cleaner, a hair dryer, or a hand-held telephone, at a first step to disassemble into at least two different components. It is also directed towards crushing at a second step the components of the electronic instrument separated at the first step to separate and recover valuables in different material groups. It is further directed towards crushing a resin body e.g. of a deflection yoke in a short period of time to separate the body from deflection coils. A crushing apparatus according to the present invention employs no blades but drives rotor extensions and upright studs for impact crushing, hence eliminating such extra maintenance jobs for grinding or replacing the blades.

For solving the foregoing problems, the crushing apparatus of the present invention comprises a rotor having a truncated substantially conical projected center mounted perpendicularly at the center of rotation thereof and protrudent members (e.g. round bars)mounted perpendicularly on extensions thereof extending radially from the center of rotation, a rotor rotating means for rotating the rotor, a bottom-closed case in which the rotor is installed at the bottom. In particular, a plurality of protrudent members (e.g. round bars) extending horizontally are mounted on the inner side of the bottom-closed case. The rotor is rotated at a speed of a few hundreds to two thousand revolutions per minute. The crushing apparatus of the present invention is based on the impact crushing effect (a plastic fracture) caused by collision energy between the rotor and the object to be crushed and collision energy between the object to be crushed and the bottom-closed case wall and between the object to be crushed and the protrudent members, which is different from the shearing effect (a shear cutting) with the use of blades or knives. The crushing apparatus of the present invention may be arranged with the rotor axis and the bottom-closed case tilting at a desired angle to the vertical.

According to the present invention, a method of crushing a printed circuit board is provided comprising the steps of loading a first printed circuit board into the bottom-closed case of the crushing apparatus and rotating the rotor on which the studs (bars) are mounted to crush the first printed circuit boards into pieces of a size ranging from a few to ten centimeters square and separate various components, wires, and second printed circuit boards from the first printed circuit boards.

According to the present invention, a method of disassembling a deflection yoke is provided comprising the steps of loading a deflection yoke into the bottom-closed base of the crushing apparatus and rotating the rotor to separate the deflection yoke into deflection coils (winding coils) and crushed pieces of a resin base.

According to the present invention, a method of disassembling a tuner is provided comprising the steps of loading a tuner equipped with a shielding case and a printed circuit board for controlling into the bottom-closed case of the crushing apparatus and rotating the rotor to separate the tuner into the shielding case and the crushed printed circuit board.

According to the present invention, a method of disassembling an electronic component is provided comprising the steps of loading an electronic component equipped with a radiator sheet into the bottom-closed case of the crushing apparatus and rotating the rotor to separate the radiator sheet from the electronic component.

According to the present invention, a method of disassembling a transformer is provided comprising the steps of loading a transformer into the bottom-closed case of the crushing apparatus and rotating the rotor to separate the transformer into a winding core and copper windings.

According to the present invention, a method of recovering valuables from an electronic instrument is provided comprising the steps of impact crushing an electronic instrument itself or its chassis with a printed circuit board dismounted from the electronic instrument into pieces of a desired size to separate from the electronic instrument or the printed circuit board various components which are deformed more or less but maintained in substantially their original shapes.

According to the present invention, a method of recovering valuables in groups of materials from an electronic instrument or a printed circuit board is provided comprising a vibration screening step of screening the crushed pieces or components in groups of different size, a magnetic screening step of separating ferrous materials from the crushed pieces or components received from the vibration screening step, and an eddy current screening step of separating copper and aluminum materials from the crushed pieces or components received from the magnetic screening step.

The method may further comprise a second crushing step of crushing the components dismounted from the printed circuit board into pieces of a smaller size, a second magnetic screening step of separating magnetic materials from the crushed pieces received from the second crushing step, and a second eddy current screening step of separating copper and aluminum materials from the crushed pieces received from the second magnetic screening step.

As a result, the present invention allows the crushing apparatus to be simple in construction and low in production cost. Also, the various components can be dismounted from the electronic instrument or printed circuit board as quickly as 10 to 60 seconds while deformed more or less but maintained in substantially their original shapes (not exploded). The object such as a deflection yoke, a tuner, a transformer, or a house-hold electronic instrument can readily be separated into at least two different components (for example, winding coils and crushed resin body pieces of the deflection yoke). Since each of the first and second crushing steps are followed by the vibration screening step, the magnetic screening step, the eddy current screening step, and the resin separating step, valuables including metals and resins can favorably be separated and recovered. Also, the crushing apparatus of the present invention includes no blades, eliminating an extra maintenance job for grinding or replacing the blades. Accordingly, the recovery and recycling rate of the valuables will be improved and the recycling cost will be declined.

As a first embodiment of the present invention, a crushing apparatus comprises a rotor including a truncated substantially conical center provided at the center of rotation thereof, a plurality of extensions each having at least one substantially vertical stud thereon extending radially from the center of rotation, a rotor rotation driving means for rotating the rotor, and a bottom-closed case in which the rotor is mounted at the bottom, wherein the bottom-closed case has a plurality of horizontal studs mounted on its inner side. As the crushing apparatus is simple in the construction, its production cost will be decreased. Also, it allows the object to be crushed as quickly as 10 to 60 seconds and the recycling cost to be reduced.

As a second embodiment of the present invention, the crushing apparatus of the first embodiment may further comprise an air discharging means for discharging air from the bottom-closed case. As dusts produced during the action of crushing a printed circuit board and dirt accumulated on the printed circuit board are discharged to the outside, the working condition can be maintained clean.

As a third embodiment of the present invention, the crushing apparatus of the first embodiment may have an opening at least in either the bottom or the side of the bottom-closed case. The opening permits the crushed pieces or components to be removed out from the bottom-closed case at higher efficiency and in a shorter period.

As a fourth embodiment of the present invention, a method of crushing a printed circuit board comprises the steps of loading a first printed circuit board into the bottom-closed case of the crushing apparatus of the first embodiment and rotating the rotor to crush the first printed circuit board into pieces of a desired size and separate electronic components, radiator sheets, wires, second printed circuit boards, and others from the first printed circuit board. The method carries out crushing the printed circuit board and separation of the components in a shorter period of time. The volume of the printed circuit board can hence be easily decreased (volumetric reduction), facilitating the handling and the transfer between the steps.

As a fifth embodiment of the present invention, a method of disassembling a deflection yoke comprises the steps of loading a deflection yoke into the bottom-closed case of the crushing apparatus of the first embodiment and rotating the rotor to separate winding coils from crushed pieces of a resin base of the deflection yoke. Accordingly, the number of steps for disassembling and the recycling cost can be reduced.

As a sixth embodiment of the present invention, a method of disassembling an electronic component or a household electrical instrument comprises the steps of loading an electronic component or a household electrical instrument into the bottom-closed case of the crushing apparatus of the first embodiment and rotating the rotor to separate crushed pieces of a housing and a printed circuit board from various components dismounted from the printed circuit board. The method allows the electronic component or the household electrical instrument to be separated into at least two different components as quickly as 10 to 60 seconds.

As a seventh embodiment of the present invention, a method of recovering valuables from an electronic instrument comprises a removal step of removing a chassis with a printed circuit board from the electronic instrument, a chassis crushing step of crushing the chassis and the printed circuit board to pieces of a desired size and separating from the printed circuit board various components which are dismounted and maintained in substantially their original shapes, a vibration screening step of screening the crushed pieces and components in groups of different sizes, a magnetic screening step of separating ferrous materials from the crushed pieces and components received from the vibration screening step, and an eddy current screening step of separating copper and aluminum materials from the crushed pieces and components received from the magnetic screening step. The method allows the components to be readily dismounted from the printed circuit board with their original shapes being substantially maintained and separated into different material groups.

As an eighth embodiment of the present invention, the method of recovering valuables from an electronic instrument of the seventh embodiment of the present invention may further comprise a second crushing step of crushing the components separated from the printed circuit board into pieces of a smaller size, a second magnetic screening step of separating ferrous materials from the crushed pieces and components received from the second crushing step, and a second eddy current screening step of separating copper and aluminum materials from the crushed pieces and components received from the second magnetic screening step. The method allows different materials including metals and resins to be recovered from the components easily and readily.

As a ninth embodiment of the present invention, a method of recovering valuables from an electronic instrument comprises a crushing step of loading the electronic instrument into the crushing apparatus and separating crushed pieces of a cabinet and a printed circuit board from various components which are dismounted from the printed circuit board and maintained in substantially their original shapes, a vibration screening step of screening the crushed pieces and components in groups of different sizes, a magnetic screening step of separating ferrous materials from the crushed pieces and components received from the vibration screening step, and an eddy current screening step of separating copper and aluminum materials from the crushed pieces and components received from the magnetic screening step. The method allows the components to be dismounted from the electronic instrument while being deformed more or less but maintained in substantially their original shapes and sorted in different material groups.

As a tenth embodiment of the present invention, the method of recovering valuables from an electronic instrument of the ninth embodiment may further comprise a second crushing step of crushing the crushed pieces received from the first crushing step into pieces of a smaller size, a second magnetic screening step of separating ferrous materials from the crushed pieces received from the second vibration screening step, and a second eddy current screening step of separating copper and aluminum materials from the crushed pieces received from the second magnetic screening step. The method allows different materials including metals and resins to be recovered from the components easily and readily.

PREFERRED EMBODIMENT OF THE INVENTION

The present invention will be described in the form of a crushing apparatus, a crushing method, a disassembling method, and a valuables recovering method, in conjunction with the relevant drawings showing valuables recovered from a chassis with a printed circuit board in a television receiver.

Figure 1:
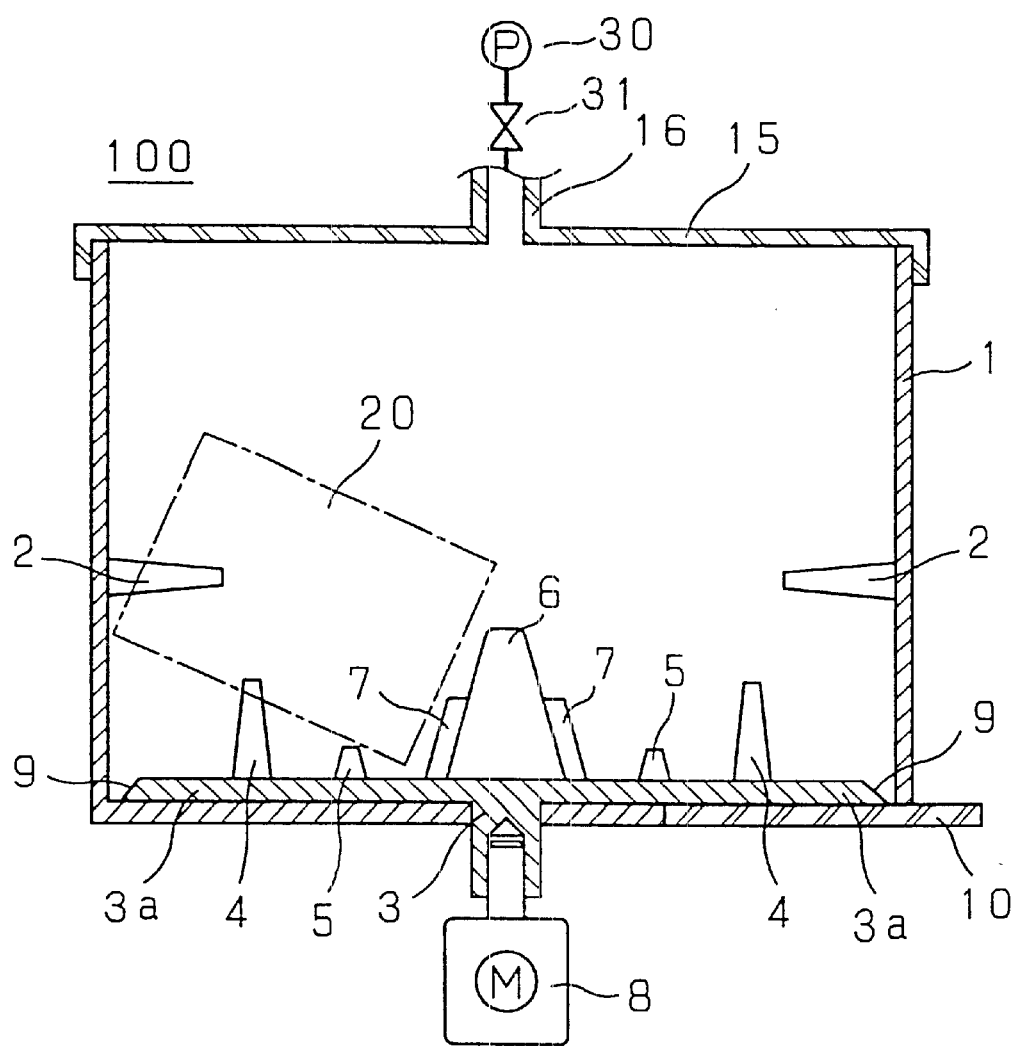
FIG. 1 is a cross sectional view schematically showing a crusher according to one embodiment of the present invention.
Figure 2:
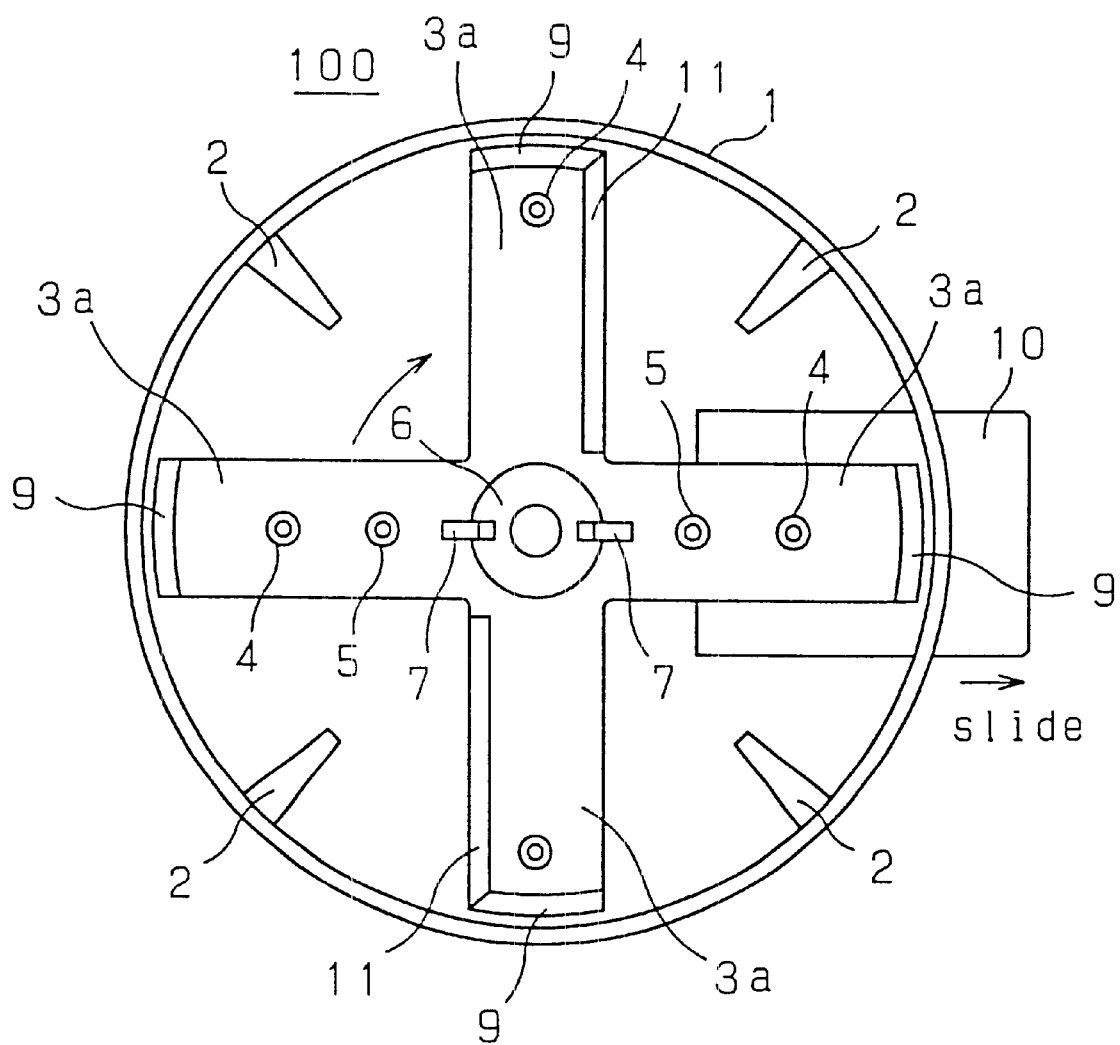
FIG. 2 is a plan view of the crusher shown in FIG. 1.
Figure 3:
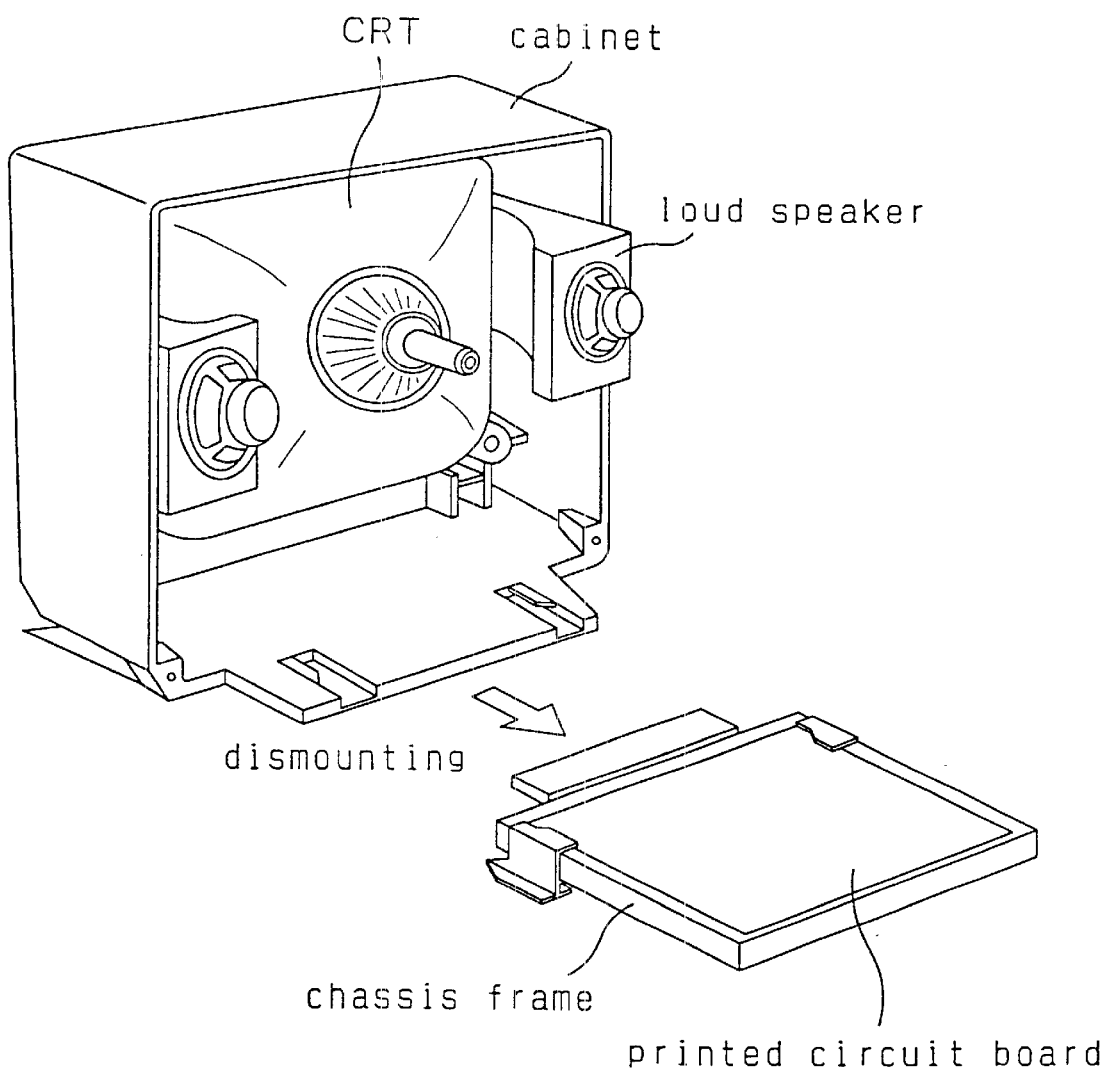
FIG. 3 is a perspective view schematically showing a chassis with a printed circuit board in a television receiver for description of the present invention.

An embodiment of the crushing apparatus of the present is now explained. FIG. 1 is a longitudinally cross sectional view schematically showing a primary part of the crushing apparatus of the embodiment of the present invention for impact crushing electronic instruments, chassis with printed circuit boards, printed circuit boards, electronic components, and others. FIG. 2 is a plan view of the crushing apparatus shown in FIG. 1. FIG. 3 is a perspective view schematically showing, for ease of the description, a television receiver and a chassis with a printed circuit board (an object to be crushed) removed from the television receiver. As shown in FIGS. 1 to 3, there are provided a cylindrical case with a bottom (a bottom-closed container) denoted by the numeral 1, first studs (substantially horizontally extending bar-like members) 2, a rotating member (a rotor) 3, extensions 3a, second studs (substantially vertically extending bar-like members) 4, third studs (substantially vertically extending bar-like members) 5, a truncated substantially conical projected center 6, fins 7, a driving motor 8, beveled edges 9, a slidable bottom plate 10, a cover 15, an exhaust conduit 16, a chassis with a printed circuit board 20, a discharge pump 30, and an electromagnetic valve 31 in the crushing apparatus denoted by 100.

More specifically, the crushing apparatus 100 according to the present invention includes the truncated substantially conical projected center 6 which extends substantially vertically from the center of rotation, the rotor 3 having the extensions 3a thereof extending radially horizontally from the truncated substantially conical projected center 6 and arranged on the surface of which at least either the second studs 4 or the third studs 5 are upwardly mounted, the driving motor 8 (a rotor rotating means) for rotating the rotor 3, the cylindrical case 1 of a bottom closed container-like shape throughout the bottom of which the rotor 3 rotates, and the first studs 2 extending horizontally from the inner sides of the cylindrical case 1. Four of the first studs 2 are disposed at equal intervals of 90 degrees. In the embodiment shown in FIG. 1, the rotor 3 is a cross shaped plate. More particularly, there are four of the extensions 3a radially extending in a cross shape. Each of one pair of the opposite extensions 3a arranged in symmetry about the center has the second stud 4, and each of the other pair of the opposite extensions 3a has a combination of the second stud 4 and the third stud 5. The rotor 3 rotates at a higher speed to strike, blow, and crush objects to be crushed (e.g. electronic devices, chassis with printed circuit boards, printed circuit boards, and electronic components) against the inner walls of the cylindrical case 1. The substantially vertically extending studs 4 and 5 and the substantially horizontally extending studs 2 are formed of a tapered bar (such as a round bar) which becomes narrower in diameter towards the distal end. The shape is contemplated for preventing jamming with the sheathed wires separated from the printed circuit boards and if such occurs, for permitting easy removal of the sheathed wires. The truncated substantially conical projected center is also shaped of a tapered bar (e.g. a round bar). A resultant centrifugal force of the truncated substantially conical projected center 6 throws the objects to be crushed against the inner walls of the cylindrical case 1. Each of the extensions 3a in the crushing apparatus 100 is provide with at least the beveled edge 9. In addition, selected ones of the extensions 3a have beveled edges 11 provided on one side thereof. The additional edges are designed for blowing the objects to be crushed upwardly from the bottom of the cylindrical case 1. The two fins 7 are also mounted on the tilting side of the truncated substantially conical projected center 6 for blowing up, hooking, and beating the objects to be crushed. The chassis with a printed circuit board 20 is primarily impact crushed by being sandwiched between the substantially vertically extending studs 4 and 5 and the substantially horizontally extending studs 2. Also, the chassis with a printed circuit board 20 is beaten and crushed by the extensions 3a and the fins 7 as well as the studs 4 and 5.

For example, the apparatus of the present invention may be sized so that the cylindrical case 1 has an inner diameter of 56 cm and the overall height is 70 cm. The truncated substantially conical projected center 6 has a base diameter of 12 cm and 15 cm height. The extension 3a may be 1 cm in thickness and 5 cm in width. The fins 7 may extend about 2 cm from the conical projected center 6 and their length may be about 7.5 cm. The substantially horizontally extending studs 2 and the substantially vertically extending studs 4 and 5 may be about 2 cm in diameter at the proximal end and about 1.5 cm in diameter at the distal end. The length of the studs 2 may be 8 cm, of the studs 4 may be 7 cm, and of the studs 5 may be 3 cm. The distance from center to center between the conical projected center 6 and the stud 5 may be about 9 cm and similarly between the studs 4 and 5 may be about 9 cm.

The studs 2, 4, and 5 are made of a common machine steel (JIS S45C). If desired, they may be formed of a higher impact-resistant material, for example, selected from nickel chrome steel (SNC631), nickel chrome molybdenum (SNCM420), chrome molybdenum (SCM430), chrome steel (SCr430), and manganese machine steel (SMn433).

The cylindrical case 1 of the crushing apparatus 100 of the present invention is closed at its upper opening with the openable cover 15. The conduit 16 extends across the cover 15 via the electromagnetic valve 31 to the discharge pump 30 for discharging air from the cylindrical case 1. The removal of air is preferably carried out during the crushing action and continued a few minutes after the completion of the crushing action and the opening of the cover 15. The exhaust conduit 16 may be mounted to a side of the cylindrical case 1. The discharge pump 30 may be selected from commonly available dust collecting means including commercial dust collectors, industrial vacuum cleaners, and cyclone dust collectors. The cover 15 may be of an insertion detachable type or a hinge type with one end hinged to the top of the cylindrical case 1 for opening and closing. The air discharging means can collect and discharge dust generated during the crushing of objects such as chassis with printed circuit boards or derived from the chassis with printed circuit boards, hence maintaining favorable working conditions.

In addition, the crushing apparatus 100 of the present invention has the cylindrical case 1 provided with the slidable bottom plate 10 which can slide to open a portion of the bottom. Through the opening of the bottom, the crushed pieces of the chassis, the printed circuit boards, and the devices as well as the recovering components and the sheathed wires and leads can successfully be removed from the cylindrical case 1 at a higher efficiency and a shorter period. While the pieces and others are being removed, the rotor 3 is slowly turned in both forward and backward directions. The forward and backward movement of the rotor 3 may be repeated several times. The opening for removal of the crushed pieces and others is not limited to being in the bottom of the cylindrical case 1. It would be understood that the opening may be provided in a side of the cylindrical case 1 or the upper opening of the cylindrical case 1 may be utilized for this purpose.

When the crushed pieces and others are removed from the side opening of the cylindrical case 1, it is desirable for the cylindrical case 1 to be tilted at a favorable angle to the vertical. More specifically, the rotor 3 and the cylindrical case 1 in the crushing apparatus are tilted at a predetermined angle (about 30 to 40 degrees) to the vertical for ease of removal. Alternatively, the cylindrical case 1 may mechanically be tilted only after the completion of the crushing action for removing the crushed pieces and others from its opening. In either case, the cylindrical case 1 is provided with the opening in the side thereof and the openable covering means for opening and closing the opening. Further it is possible to make the openings for removing the crushed pieces both in a side portion and in a bottom portion of the cylindrical case 1. It is also possible to turn the cylindrical case 1 upside down for removing the crushed pieces and others.

Crushing Method Example 1

Steps of firstly crushing the chassis with a printed circuit board 20 and sorting various components which are separated in substantially their original shapes from the printed circuit board and of secondly crushing some of the components to pieces which are then recovered in particular groups will now be described. The steps are illustrated in the flowchart of FIG. 4.

It is assumed that the chassis with a printed circuit board 20 to be loaded into the cylindrical case 1 carries a printed circuit board of A4 size (about 30 cm by 20 cm) for controlling the action of a television receiver, as shown in FIG. 3. The chassis itself is made of a synthetic resin or metal. The printed circuit board includes a variety of electronic components (including resistors, capacitors, coils, transistors, ICs, connectors, flyback transformers, and tuners) mounted by soldering on both sides of its substrate. Also, aluminum radiator sheets and second and third printed circuit boards of smaller sizes are mounted on the main side of the printed circuit boards. Sheathed wires (cables) are used to connect between the printed circuit boards, between the components, and between the components and the printed circuit boards (not shown).

Figure 4:
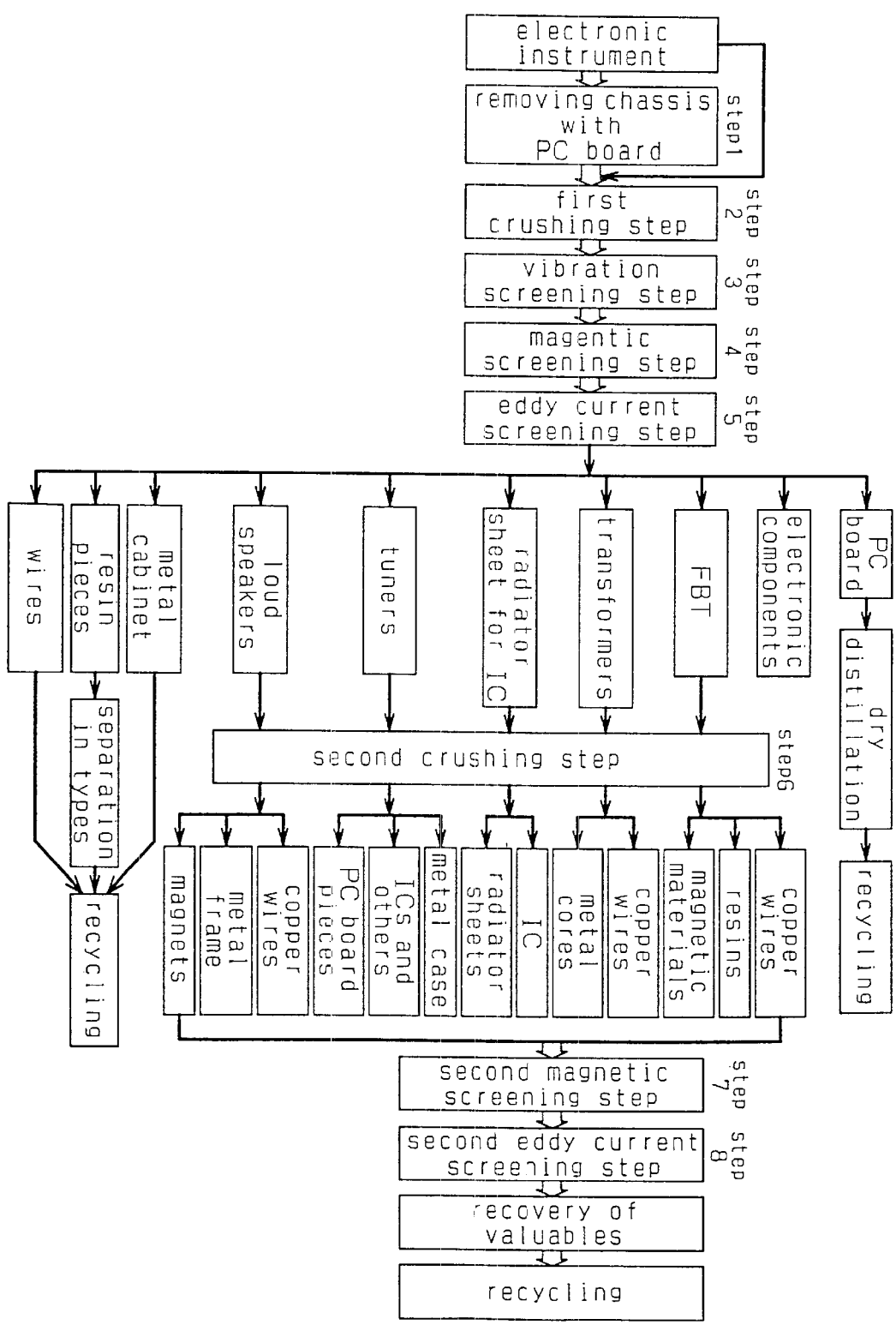
FIG. 4 is a flowchart of a method of recovering valuables from an electronic instrument according to one embodiment of the present invention.

The method of recovering valuables from an electronic instrument, according to the present invention, as illustrated in the flowchart of FIG. 4, comprises separating the chassis with a printed circuit board 20 from the electronic instrument or television receiver (at Step 1), crushing the chassis with a printed circuit board 20 into pieces of a predetermined size and separating from the printed circuit board the components which are deformed more or less but still maintained in substantially their original shapes (at First Crushing Step 2), vibration screening the components and the crushed pieces to sizes (at Step 3), magnetically screening the components and the crushed pieces received from the vibration screening step to select and separate steel based materials using the attracting action of a magnetic force (at Step 4), and eddy current screening the components and the crushed pieces received from the magnetically screening step to select and separate non-steel based materials such as aluminum and copper materials using the effect of eddy currents (at Step 5). The electronic instrument may be a television receiver, a personal computer, an air conditioner, a washing machine, a refrigerator, or an electronic oven.

The method of the present invention further comprises dividing the components of the crushed printed circuit boards into different material groups and secondly crushing the material groups of the components (at Step 6), secondly magnetically screening steel based materials of the components received from the secondly crushing step (at Step 7), and secondly eddy current screening the material groups to select and recover copper and aluminum materials (at Step 8).

The crushing apparatus and the valuables recovering method according to the present invention permit various components to be separated from a printed circuit board readily in a short period of time while being deformed more or less but maintained in substantially their original shapes and sorted in different material groups. Also, the material groups of the components can be recovered in types of the materials.

The crushing apparatus of the present invention employs the rotor and the studs mounted on the rotor for crushing objects to be crushed. As no blades are used, an extra maintenance action for grinding the blades or replacing the blades is unnecessary. As a result, the recovery or the recycling rate of valuables will be improved hence lowering the overall cost.

The first crushing step will be explained in more detail. The step starts with loading the chassis with a printed circuit board 20 into the cylindrical case 1 as shown in FIG. 1. Then, the cover 15 is placed and while the air in the case 1 is being discharged, the rotor 3 is rotated at a speed of 250 to 300 revolutions per minute for about 30 seconds. This action separates from the printed circuit board a set of board tuners, flyback transformers, radiator sheets, semiconductors equipped with radiator sheets, electronic components, terminals, second and third small printed circuit boards, sheathed wires, and others which are deformed more or less but maintained in substantially their original shapes (not exploded into smaller components). Simultaneously, the chassis and the printed circuit board are crushed into pieces ranging from a few to ten centimeters square.

When the diameter of the cylindrical case 1 is increased to 86 cm with the rotor 3 enlarged proportionally, the crushing apparatus can crush two or more chassis with printed circuit boards at once. For example, three to six of the chassis with printed circuit boards 20 are loaded into the cylindrical case 1 and the rotor 3 is rotated at a higher speed of 450 to 1800 revolutions per minute. As a result, the chassis with printed circuit boards 20 can be crushed into pieces of a desired size in about 10 seconds. Simultaneously, various components can be separated from the printed circuit boards with their shapes maintained substantially. As the speed and the number of revolutions of the rotor 3 are desirably determined based on the size of the cylindrical case 1, it will be possible to crush the chassis and the printed circuit boards into pieces ranging from a few to about 10 centimeters. Also, the components can successfully be separated from the printed circuit boards with their original shapes maintained substantially.

The second crushing step will be explained in more detail. For example, 5 to 10 television receiver tuners removed from the printed circuit boards are loaded into the cylindrical case 1 and the rotor 3 is turned at a speed of 1500 revolutions per minute for about 15 seconds. As a result, the tuners are disassembled into metal covers, metal cases (housings), crushed printed circuit boards, and electronic components including ICs. In particular, the electronic components including ICs are deformed more or less but maintained in substantially their original shapes. Similarly, the cylindrical case 1 is loaded with aluminum radiator equipped electronic components such as IC or LSI semiconductors and the rotor 3 is rotated. As a result, the radiator equipped electronic components are disassembled into radiator sheets and semiconductors. The rotation of the rotor 3 is 450 to 1000 revolutions per minute for 30 to 60 seconds. Moreover, the cylindrical case 1 of the crushing apparatus is loaded with 2 to 5 television receiver transformers removed from the printed circuit boards and the rotor 3 is rotated at a speed of 1000 revolutions per minute for about 60 seconds. As a result, the transformers are disassembled into winding cores of silicon steel plates and coil wires. Similarly, flyback transformers (FBTs) can be disassembled into copper wires, resins, and magnetic materials and loud speakers can be disassembled into copper wires, metal frames, and magnets. Also, cabinet housings made of metal or resin materials can be crushed by the crushing apparatus into pieces of smaller sizes. As the bulky cabinet housings are reduced in size through the crushing, their storage and transportation during the recycling process will be made easy.

The present invention allows various components to be firstly separated from the chassis with a printed circuit board crushed while they are deformed more or less but maintained in substantially their original shapes and secondly crushed into different material groups which are then recovered respectively.

The apparatus and method of the present invention are not limited to the separation of various components from a chassis with a printed circuit board but may successfully be applicable to any separating process such as for separating and screening electronic components of the same type to be recovered in different material groups. For example, the cylindrical case of the crushing apparatus of the present invention is loaded with at least one of a video recorder/player, a CD player, an AV instrument such as a small-sized audio appliance with a cover removed, a number of portable telephones, and any other household instrument. As the rotor is rotated, various electronic components can be separated from the printed circuit boards with their original shapes maintained substantially while the housing and the printed circuit boards are crushed and recovered. The rotor may preferably be rotated at a speed of 450 to 1800 revolutions per minute for about 30 to 60 seconds. Similar to those of the chassis with a printed circuit board, the separated components are secondly crushed and recovered in different material groups.

Crushing Method Example 2

Figure 11:
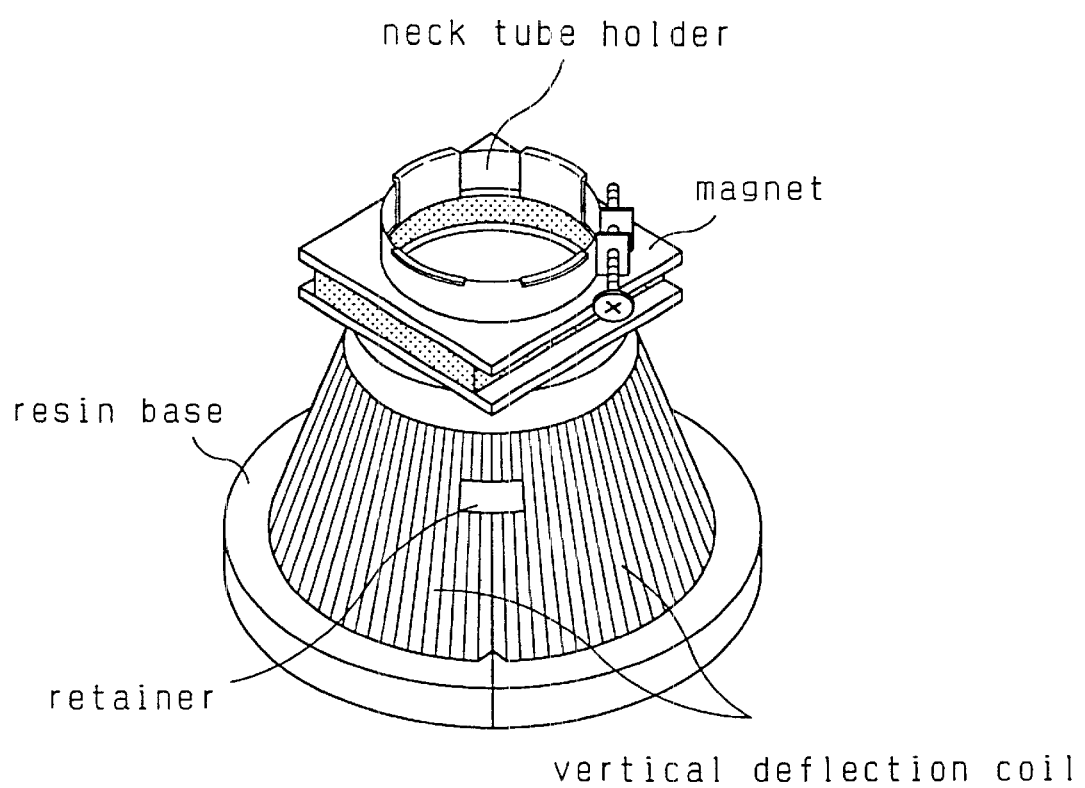
FIG. 11 is an external perspective view of a deflection yoke to be crushed according to a method of the present invention.
Figure 12:
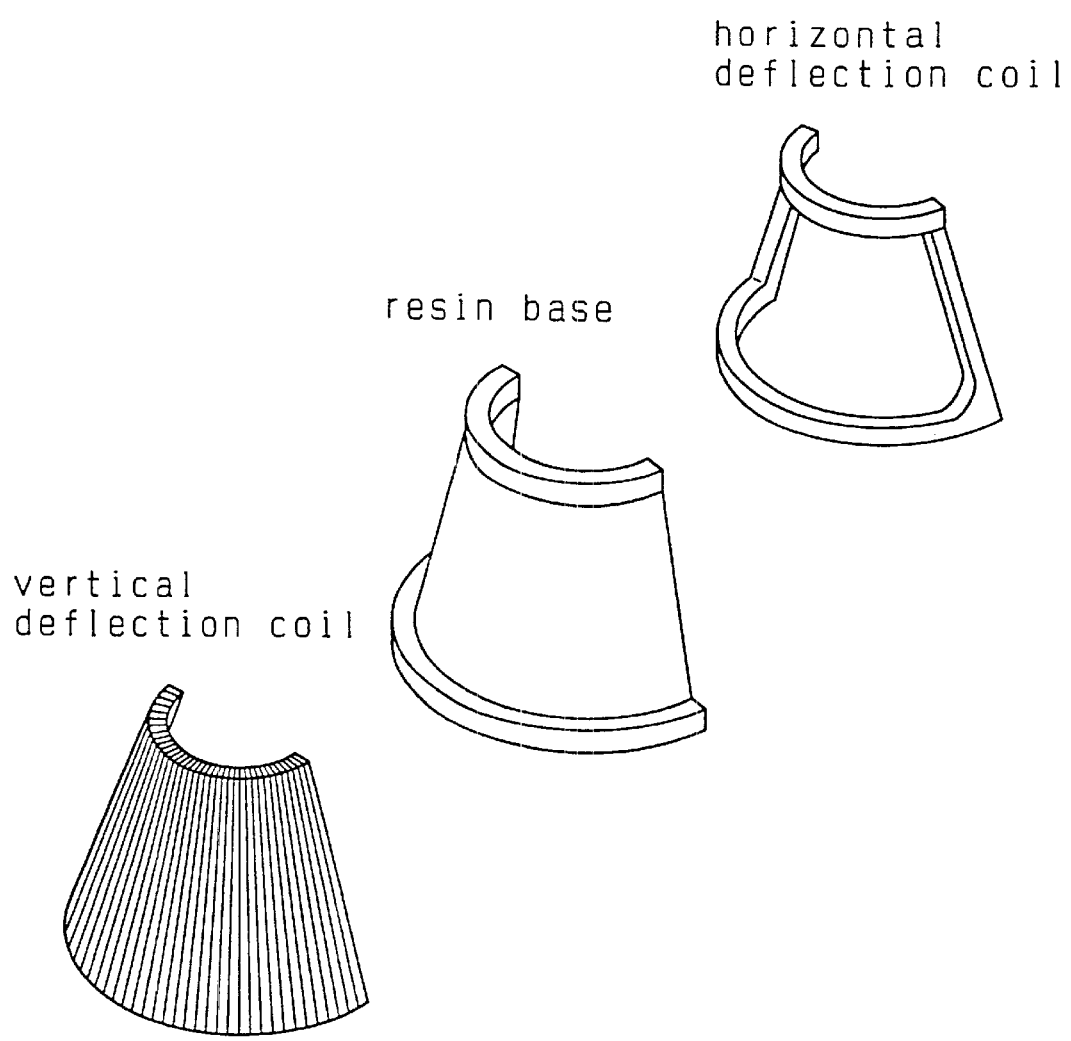
FIG. 12 is an exploded perspective view of a half of the deflection yoke shown in FIG. 11.
Figure 13:
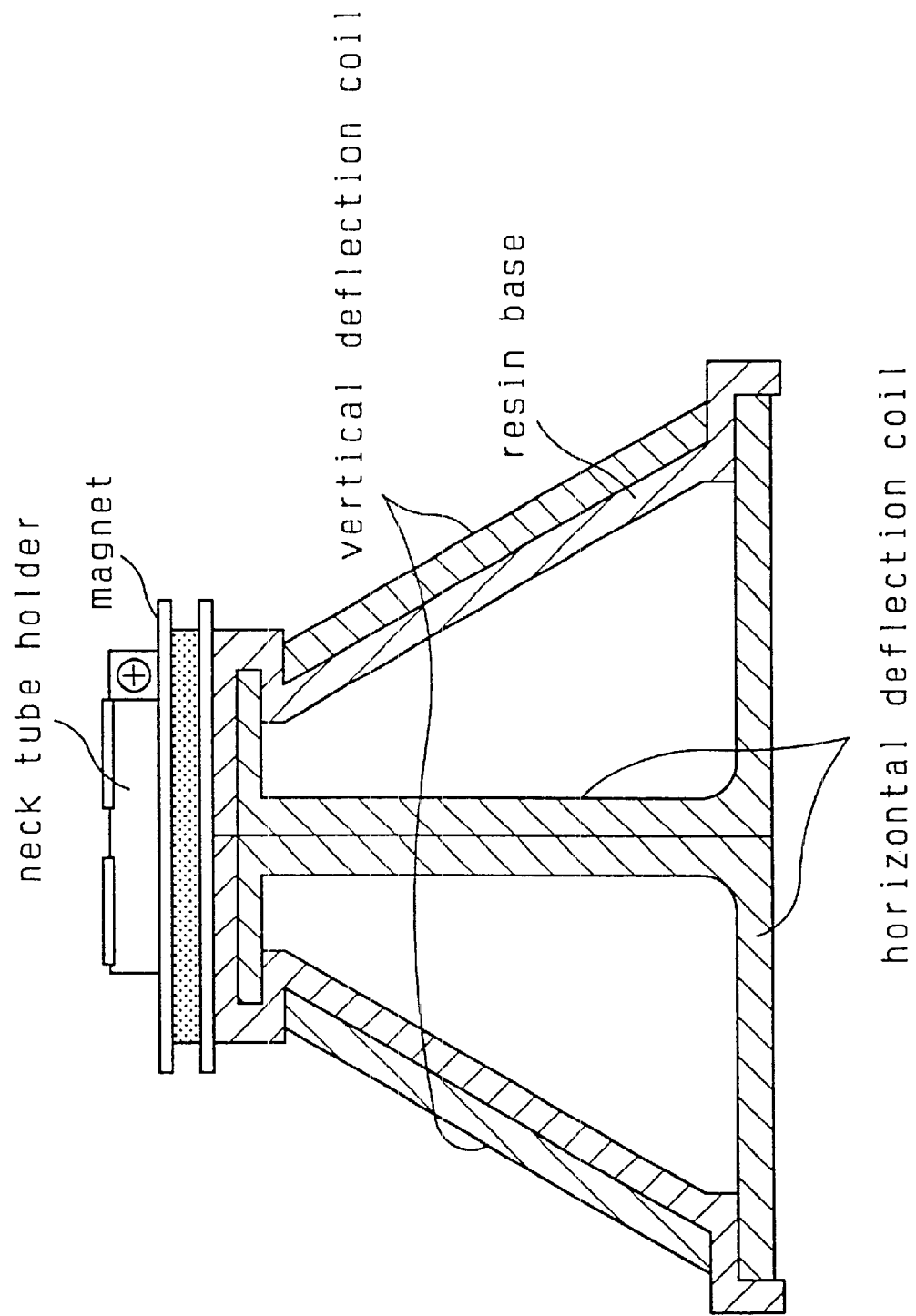
FIG. 13 is a cross sectional view of the deflection yoke shown in FIG. 11.

A method of crushing a deflection yoke as a component of a television receiver will simply be described. FIG. 11 is an external perspective view of the deflection yoke before being crushed. FIG. 12 is an exploded perspective view of one half of the deflection yoke shown in FIG. 11. FIG. 13 is a cross sectional view of the deflection yoke shown in FIG. 11. The deflection yoke comprises basically a magnet (a magnetic body), a horizontal deflection coil, a vertical deflection coil, and a resin base. The vertical deflection coil and the horizontal deflection coil are mounted to the front and back sides of the resin base, respectively. The magnet is mounted to one end of the resin base. A single unit of the deflection yoke is loaded into the cylindrical case 1 (not shown). Then, the cover 15 is placed and while the air is being discharged from the cylindrical case 1, the rotor 3 is rotated at a speed of 250 to 300 revolutions per minute for 30 seconds. As a result, the resin base is crushed into pieces of a size of a few centimeters and the winding coil and magnets are recovered.

In the method of this embodiment, known screening methods and commercially available machines are used as the vibration screening apparatus (for example, of a drum type or a cascade type having a series of different mesh screens), the magnetic screening apparatus (for example, of a belt conveyor type), the eddy current screening apparatus (for example, of a belt conveyor type), and the resin screening apparatus (for example, based on differences in the specific gravity, the electrical charging properties, and the microwave absorptivities) illustrated in the flowchart of FIG. 4.

The procedure shown in the flowchart of FIG. 4 may be implemented using an automated line (not shown) where any two adjacent steps are joined by a common conveyor.

Figure 5:
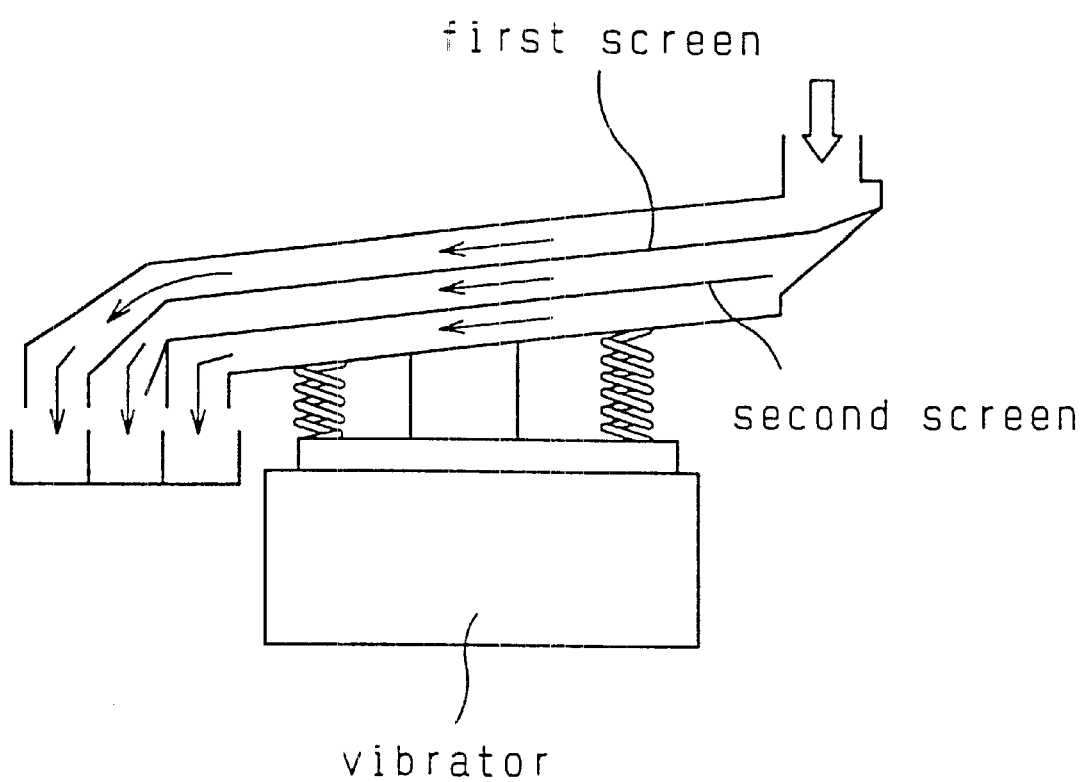
FIG. 5 is a side view schematically showing a vibration screening apparatus for description of the present invention.
Figure 6:
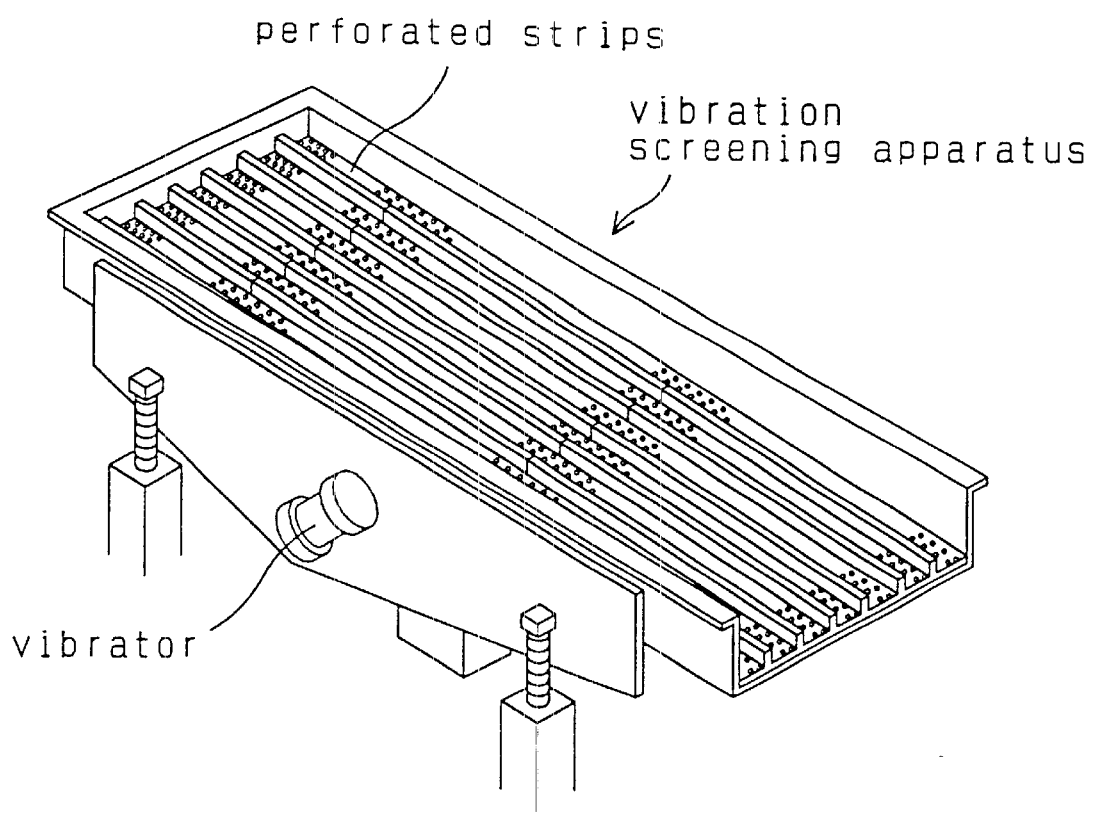
FIG. 6 is a perspective view schematically showing another screening apparatus for description of the present invention.
Figure 7:
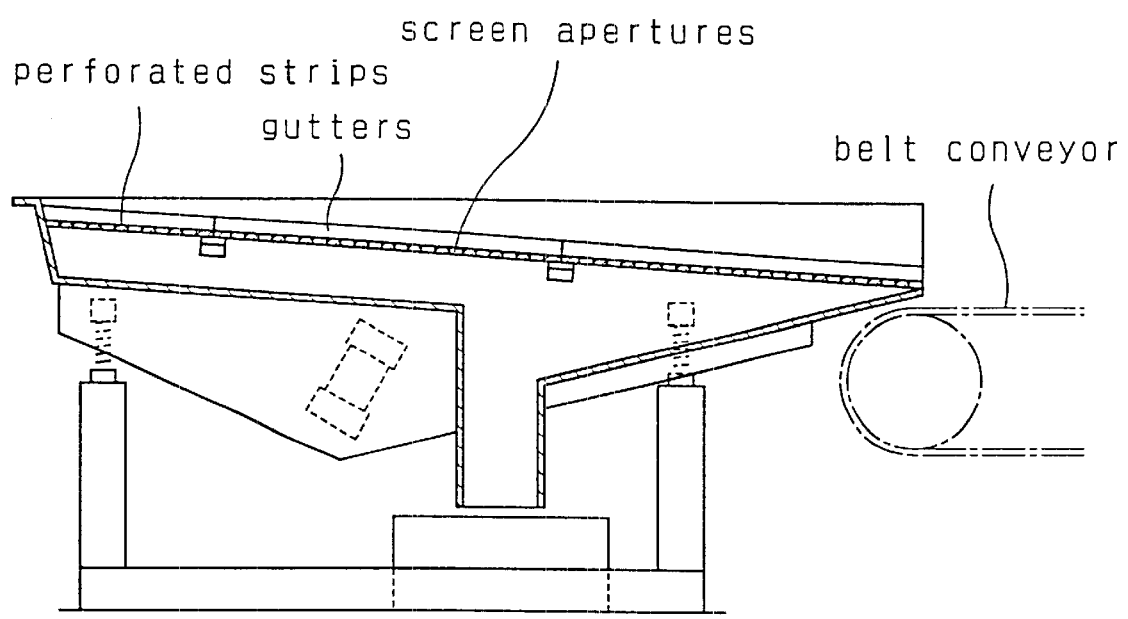
FIG. 7 is a side view of the screening apparatus shown in FIG. 6.

Examples of the screening apparatus are shown in FIGS. 5 to 7 respectively. The apparatus shown in FIG. 5 has two different screens mounted one over the other in two stories. The crushed pieces received from the preceding step are conveyed over the mesh screens which are vibrating and separated into three different sizes. The apparatuses shown in FIGS. 6 and 7 allow a desired size of the crushed pieces to be separated and collected. More specifically, a row of the apparatuses are provided when two or more different sizes are to be separated.

Figure 8:
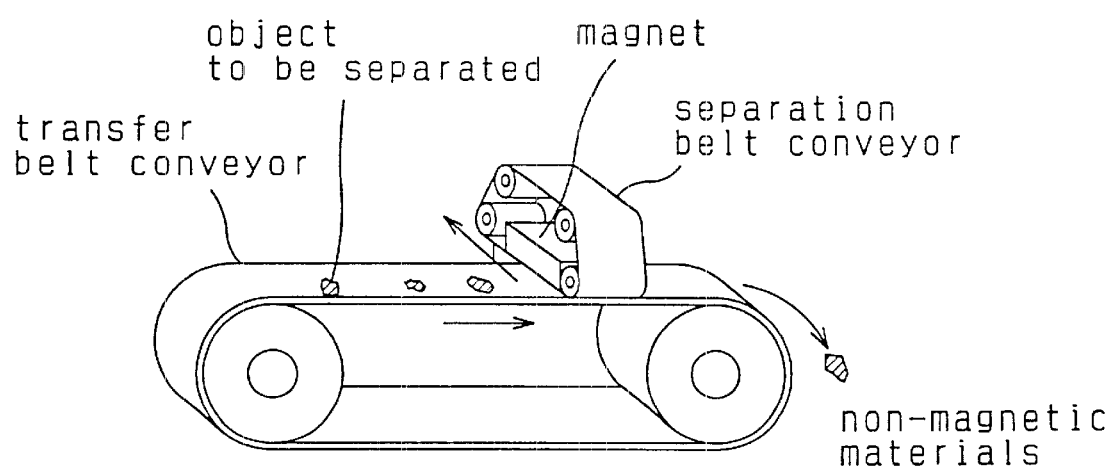
FIG. 8 is a perspective view schematically showing a magnetic screening apparatus for description of the present invention.
Figure 9:
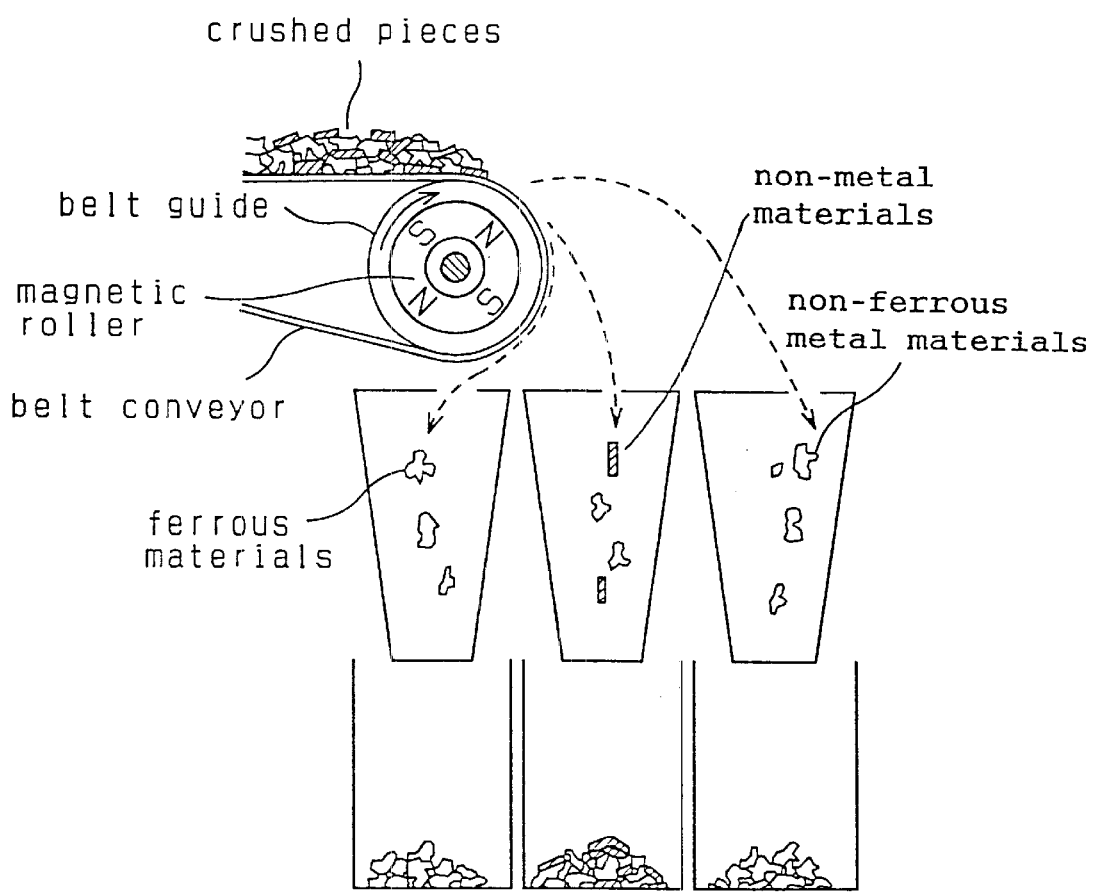
FIG. 9 is a perspective view schematically showing another magnetic screening apparatus for description of the present invention.

An example of the magnetic screening apparatus is shown in FIG. 8. The apparatus has a separating belt for attracting and separating ferrous materials from the crushed pieces received from a belt conveyor. FIG. 9 illustrates another example of the magnetic screening apparatus for separating the crushed pieces into three different materials; ferrous materials, non-ferrous metal materials, and non-metal materials (such as resins).

Figure 10:
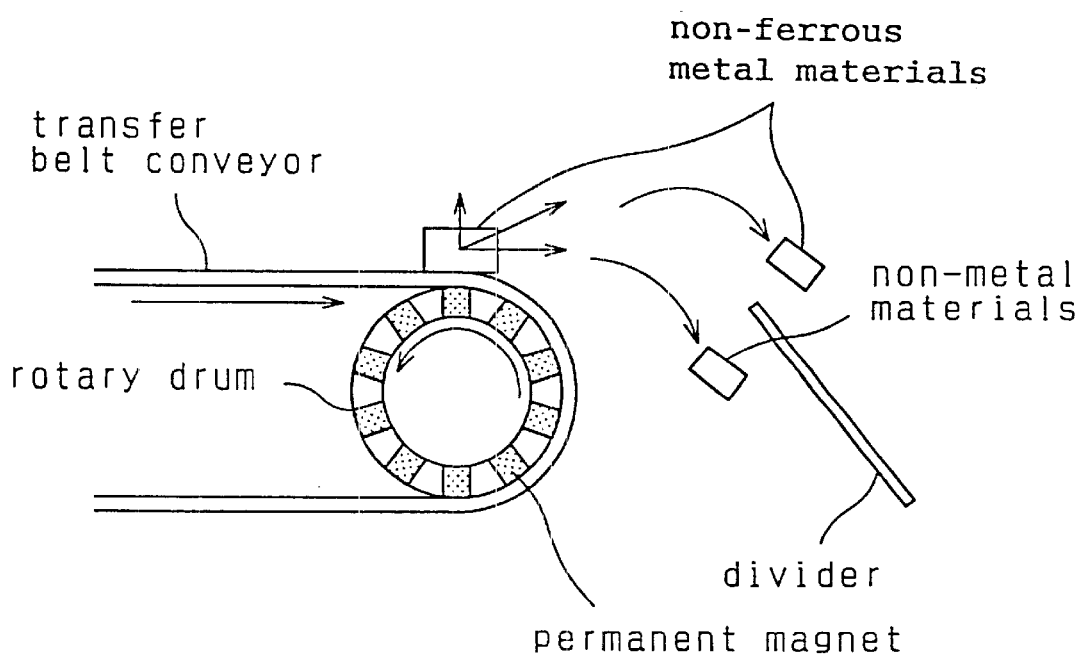
FIG. 10 is a side view schematically showing an eddy current screening apparatus for description of the present invention.

An example of the eddy current screening apparatus is shown in FIG. 10. The apparatus separates non-ferrous metal materials such as copper and aluminum from the crushed pieces received by a belt conveyor from the magnetic screening step.

It is understood that, for the crushing apparatus of the present invention for carrying out the first and second crushing steps, the number of the extensions of the conical projected center 3 and the number, position, shape (round, square, triangle, or polygonal in cross section and triangle or four-sided configuration), and size of the studs 2, 4, and 5 are not of limitations but may arbitrarily be determined depending on the objects to be crushed. The case 1 is not limited to a bottom-closed container but may be a polygonal drum or any appropriate shape. It is also possible to tilt the center axis of the rotor and the cylindrical case of the crushing apparatus at a desired angle to the vertical. Also, the number of revolutions of the rotor and the time required for the revolutions may arbitrarily be determined depending on the number, size, and type of the objects to be crushed or the size of crushed pieces of the printed circuit board. Moreover, the truncated substantially conical projected center 6 mounted vertically at the center of rotation may be modified to another appropriate shape such as a truncated cone with a round head, a semi-spherical shape, a projection shaped in substantially a parabola in vertical cross section, a cannonball shape, or a truncated cannonball shape. The cylindrical case and the slidable bottom plate may be made of a non-magnetic material such as stainless steel. In that case, when the electronic component containing magnetic materials, such as the deflection yoke or the loud speaker, is crushed, the magnetic materials of their crushed pieces are not attracted by the cylindrical case and the slidable bottom plate of the non-magnetic material and can thus be readily removed from the cylindrical case. Furthermore, if the crushing action produces intolerable sounds, the cover or the cylindrical case may be protected with an anti-vibration, sound-proof lining or the crushing apparatus itself may be covered thoroughly with a sound insulating enclosure. The cylindrical case may be accompanied indirectly or directly at its lowermost portion with either a belt conveyor for conveying the crushed pieces or a roller conveyor for conveying a succession of containers in which the crushed pieces are carried. Also, the objects to be crushed from which valuables are recovered are not limited to the used or waste household electrical appliances (including electronic components, printed circuit boards, and electronic devices) but may be any other materials. For example, characteristic examples of the objects to be crushed are defective electronic components or devices, product fragments produced during the manufacturing of products, toys, furniture products, tablewares, cooking instruments, wooden products, glass products, ceramic products, and other household products.

Industrial Applicability

As set forth above, the present invention provides a crushing apparatus which is simple in construction and low in production cost. The crushing apparatus of the present invention employs no blades and requires no maintenance for grinding or replacing the blades, hence having less tendency to encounter functional errors.

The valuables recovering method of the present invention allows the deflection yoke to be automatically disassembled to separate winding coils from crushed resin pieces in a short period of time as compared with a conventional method wherein the yoke is manually disassembled. Also, the object to be crushed such as a tuner, a transformer, an electronic component equipped with a radiator sheet, or other household instruments can systematically be separated into at least two different materials. The object to be crushed can easily be reduced in volume.

Moreover, various components can be separated (or disassembled) from the electronic instrument or printed circuit board in as quickly as 10 to 60 seconds while they are deformed more or less but maintained in substantially their original shapes. The second crushing step permits the components to be crushed and separated in different material groups. Also, since each of the first and second crushing steps is followed by the vibration screening step, the magnetically screening step, the eddy current screening step, and the resin separating step, the electronic components, metals and resins can be separated in different material groups, respectively. As a result, the recovery and recycling rate of the valuables will be improved and the recycling cost will be lowered.

What is claimed is:

1. A crushing apparatus comprising a rotor including a plurality of extensions thereof extending radially from the center of rotation, a rotor rotation driving device for rotating the rotor, a case in which the rotor is mounted at the bottom and an air discharging device for discharging air from the case, wherein the rotor has a plurality of studs mounted on its surface and a conical or truncated conical projected center mounted at the center of rotation thereof while the case has a plurality of studs mounted on its inner side.

2. A crushing apparatus according to claim 1, wherein the studs mounted on the surface of the rotor and the studs mounted on the inner side of the case have distal ends, respectively, and become narrower in diameter towards the distal ends.

3. A crushing apparatus according to claim 1, wherein the conical or truncated conical projected center of the rotor has fins mounted thereon.

4. A crushing apparatus according to claim 1, wherein said plurality of extensions comprises three extensions forming a Y shape.

5. A crushing apparatus according to claim 1, wherein said plurality of extensions comprises four extensions forming a cross shape.

6. A crushing apparatus according to claim 1, wherein each of the extensions of the rotor has at least one end thereof beveled.

7. A crushing apparatus according to claim 1, wherein each of the extensions of the rotor has at least one side thereof beveled.

8. A crushing apparatus according to claim 1, further comprising a cover for closing an opening provided in the case.

9. A crushing apparatus comprising a rotor including a plurality of extensions thereof extending radially from the center of rotation, a rotor rotation driving device for rotating the rotor, a case in which the rotor is mounted at the bottom and an opening mechanism for opening a portion of the bottom of the case, wherein the rotor has a plurality of studs mounted on its surface and a conical or truncated conical projected center mounted at the center of rotation thereof while the case has a plurality of studs mounted on its inner side.

10. A method of crushing a printed circuit board, comprising: loading a first printed circuit board into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to crush the first printed circuit board into pieces of a desired size.

11. A method of crushing a printed circuit board according to claim 10, wherein the first printed circuit boards carries thereon at least one selected from a group of an electronic component, a radiator, a flyback transformer, a tuner, and a second printed circuit board.

12. A method of crushing a printed circuit board, comprising: loading a first printed circuit board into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to crush the first printed circuit board into pieces of a desired size and separate from the first printed circuit board at least one set selected from a set of electronic components, a set of radiator sheets, a set of wires, and a set of second printed circuit boards.

13. A method of crushing a printed circuit board according to claim 12, wherein the first printed circuit board is crushed while air is being discharged from the case.

14. A method of disassembling a deflection yoke, comprising: loading a deflection yoke into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to separate the deflection yoke into at least windings and crushed pieces of a resin base.

15. A method of disassembling a tuner, comprising: loading a tuner into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to separate the tuner into at least a shielding case and crushed pieces of a printed circuit board for controlling.

16. A method of disassembling an electronic component, comprising: loading an electronic component equipped with a radiator sheet into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to separate the radiator sheet from the electronic component.

17. A method of disassembling a transformer, comprising: loading a transformer into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to separate the transformer into at least a winding core and copper windings.

18. A method of recovering valuables from an electronic instrument, comprising: loading an electronic instrument into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to separate the electronic instrument into at least crushed pieces of a cabinet and a printed circuit board and various components which are dismounted from the printed circuit board and deformed but substantially kept in their shapes.

19. A method of recovering valuables from an electronic instrument, comprising: removing a chassis from the electronic instrument; crushing the chassis by loading the chassis into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side and rotating the rotor to crush the chassis and a printed circuit board carried on the chassis to pieces of a desired size and separate from the printed circuit board various components which are dismounted and deformed but substantially kept in their shapes; performing vibration screening to screen the crushed pieces and components in groups of different size; performing a magnetic screening to separate ferrous materials from the crushed pieces and components received from the vibration screening; and performing an eddy current screening to separate copper and aluminum materials from the crushed pieces and components received from the magnetic screening.

20. A method of recovering valuables from an electronic instrument according to claim 19, further comprising: performing a second crushing to crush the components separated from the printed circuit board into pieces of a smaller size; performing a second magnetic screening to separate ferrous materials from crushed pieces and components received from the second crushing; and performing a second eddy current screening to separate copper and aluminum materials from the crushed pieces and components received from the second magnetic screening.

21. A method of recovering valuables from an electronic instrument, comprising: crushing the electronic instrument by loading the electronic instrument into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to separate the electronic instrument into at least crushed pieces of a cabinet and a printed circuit board and various components which are dismounted from the printed circuit board and deformed but substantially kept in their shapes; performing a vibration screening to screen the crushed pieces and components in groups of different size; performing a magnetic screening to separate ferrous materials from the crushed pieces and components received from the vibration screening; and performing an eddy current screening to separate copper and aluminum materials from the crushed pieces and components received from the magnetic screening.

22. A method of recovering valuables from an electronic instrument according to claim 21, further comprising performing a second crushing to crush the crushed pieces received from the first crushing into pieces of a smaller size; performing a second magnetic screening to separate ferrous materials from crushed pieces received from the second crushing; and performing a second eddy current screening to separate copper and aluminum materials from the crushed pieces received from the second magnetic screening.

23. A method of recovering valuables from a printed circuit board, comprising: crushing a printed circuit board by loading the printed circuit board into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to crush the printed circuit board into pieces of a desired size and separate from the printed circuit board various components which are dismounted and deformed but substantially kept in their shapes; performing a vibration screening to screen the crushed pieces and the components in groups of different size; performing a magnetic screening to separate ferrous materials from the crushed pieces and components received from the vibration screening; and performing an eddy current screening to separate copper and aluminum materials from the crushed pieces and components received from the magnetic screening.

24. A method of recovering valuables from an electronic component, comprising: loading an electronic component into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to separate the electronic component into at least two different materials.

25. A method of recovering valuables from an electronic component according to claim 24, further comprising: performing a vibration screening to screen the crushed pieces in groups of different size; performing a magnetic screening to separate ferrous materials from the crushed pieces received from the vibration screening; and performing an eddy current screening to separate copper and aluminum materials from the crushed pieces received from the magnetic screening.

26. A method of reducing the volume of a cabinet, comprising: loading a cabinet into a crushing apparatus comprising a rotor including a plurality of extensions thereof extending radially from the center of rotation, a rotor rotation driving device for rotating the rotor, and a case in which the rotor is mounted at the bottom, wherein the rotor has a plurality of studs mounted on its surface and a conical or truncated conical projected center mounted at the center of rotation thereof while the case has a plurality of studs mounted on its inner side; and rotating the rotor to crush the cabinet into small pieces.

* * * * *